(No Model.)
H. H. GRIDLEY.
LAWN TRIMMER.
No. 391,742. Patented Oct. 23, 1888.
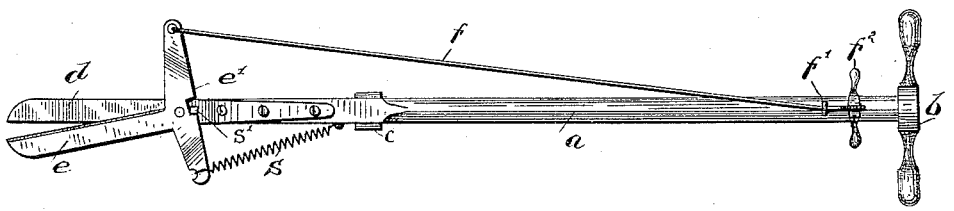
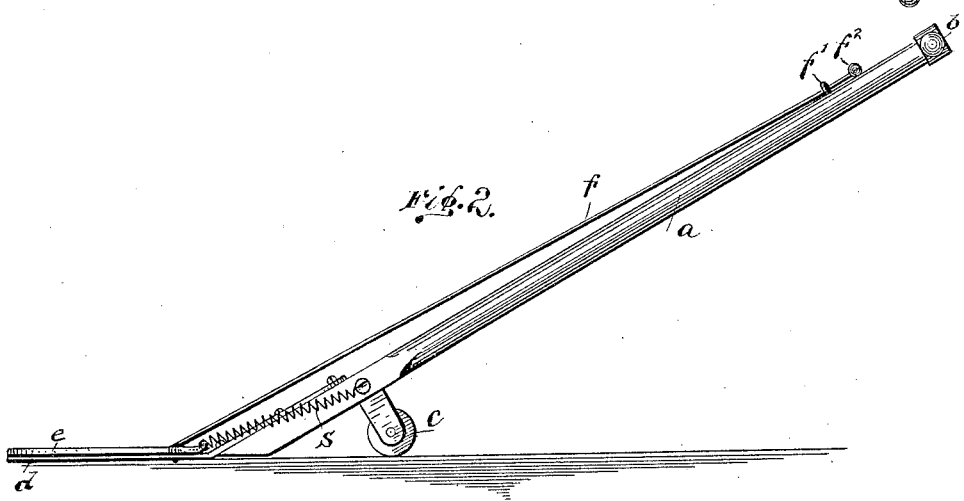
WITNESSES:
C. W. H. Brown,
N. Want
INVENTOR,
H. H. Gridley.
BY
J. J. Freemoyk,
ATTORNEY.

United States Patent Office.

HENRY H. GRIDLEY, OF FULTON, NEW YORK, ASSIGNOR OF ONE-HALF TO JOHN J. BONNEY, OF SAME PLACE.

LAWN-TRIMMER.

SPECIFICATION forming part of Letters Patent No. 391,742, dated October 23, 1888.

Application filed November 7, 1887. Serial No. 254,483. (No model.)

*To all whom it may concern:*

Be it known that I, HENRY H. GRIDLEY, of Fulton, Oswego county, State of New York, have invented a new and useful Improvement in Lawn-Trimmers, of which the following is a specification.

My invention relates to an implement for trimming the edges of grass-plats and around shrubbery, &c., where an ordinary lawn-mower will not act. I attain the result by the mechanism illustrated in the annexed drawings, in which—

Figure 1 is a top plan. Fig. 2 is a side elevation.

The letters of reference designate like parts in both figures.

Letter $a$ refers to a wooden bar or hand-lever, to the upper end of which is affixed a short cross-piece forming a handle, $b$, to be held in the hands of the operator. The lower end of the bar $a$ is enlarged and beveled off on the under side, near which point a roller, $c$, is attached, that runs on the ground and forms a support for the implement when in use. On the upper face of the bar $a$ I firmly affix a knife-blade, $d$, formed of a thin plate of steel or other proper material, its shank being made long for that purpose, with its straight cutting part projecting out from it beyond the lower end of the bar. This part is bent upward at its junction with the shank, so as to be horizontal when bar $a$ is held by the hands of the operator in an inclined position, as seen in Fig. 2. An upper blade, $e$, formed of a similar plate, is pivoted to the lower one similar to the blades of shears. At the base of blade $e$ two arms radiate at right angles from the pivot, to the longest, $e'$, of which a rod, $f$, is attached that extends up to near the handle $b$, where it is held in place by a staple, $f'$, or other fixture upon the bar $a$, through which the rod slides. To the upper end of the rod $f$ a cross-handle, $f^2$, is affixed, by means of which the rod is drawn up by the hand of the operator and closes the cutting edges of the blades together on each other. On the short arm projecting from blade $e$ there is a hook to which one end of a spiral spring, $s$, is hooked, the other end being brought up on the bar $a$, where it is attached with tension sufficient to open the blade when released by the hand. By this construction the blades are opened and closed by the action of the hand at the upper end of the bar $a$.

To determine the range of motion of the movable blade $e$, a stud, $s'$, is projected up from the stationary blade $d$, near the pivotal point. This stud works in a notch formed in the movable upper blade of a proper length to allow it necessary motion. These blades are stamped out of thin plates of steel by dies to the shape and form required.

In operation the blades are held level or at any desired angle for the work, as the implement is moved along for trimming grass-plats at the edges and around the shrubbery, mounds, &c., where the ordinary lawn-mower cannot act.

It is obvious that a loop form or other spring may be substituted for the spiral spring $s$ without changing the invention.

Having thus fully described my new tool for trimming the edges of grass-plats, &c., I claim—

In a lawn-trimmer, the combination of the fixed blade $d$ and pivoted blade $e$, bar $a$, having a cross handle projecting laterally therefrom by which it is guided, a support at its lower end on which it is moved over the ground, the blades being held at any angle, and the rod $f$, having a handle near the cross-handle of the bar $a$, whereby the pivoted blade is operated by hand while holding the said cross-handle of bar $a$, substantially as described.

HENRY H. GRIDLEY.

Witnesses:
CHAS. WHITAKER,
S. B. WHITAKER.